(12) United States Patent
Hemphill

(10) Patent No.: US 11,168,690 B2
(45) Date of Patent: Nov. 9, 2021

(54) INTEGRATED MOTOR AND PUMP INCLUDING AXIALLY PLACED COILS

(71) Applicant: Schaeffler Technologies AG & Co. KG, Herzogenaurach (DE)

(72) Inventor: Jeffrey Hemphill, Copley, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 189 days.

(21) Appl. No.: 16/381,177

(22) Filed: Apr. 11, 2019

(65) Prior Publication Data
US 2020/0325898 A1 Oct. 15, 2020

(51) Int. Cl.
| | | |
|---|---|---|
| *F04C 29/00* | (2006.01) | |
| *F04C 2/10* | (2006.01) | |
| *F16H 39/00* | (2006.01) | |

(52) U.S. Cl.
CPC ............ *F04C 29/0085* (2013.01); *F04C 2/10* (2013.01); *F16H 39/00* (2013.01); *F04C 2230/60* (2013.01); *F04C 2240/40* (2013.01)

(58) Field of Classification Search
CPC .... F04C 29/0085; F04C 2/10; F04C 2230/60; F04C 2240/40; F16H 39/00
USPC .................................................... 417/410.4
See application file for complete search history.

(56) References Cited

U.S. PATENT DOCUMENTS

| | | |
|---|---|---|
| 1,444,577 A | 2/1923 | Wilson |
| 2,760,348 A | 8/1956 | Mcadam |
| 3,443,378 A | 5/1969 | Goff |
| 3,490,383 A | 1/1970 | Parrett |
| 3,873,248 A | 3/1975 | Johnson |
| 4,193,746 A | 3/1980 | Aman, Jr. |
| 4,439,119 A * | 3/1984 | Petersen ................. F04C 2/103 418/186 |
| 4,619,588 A | 10/1986 | Moore, III |
| 5,062,776 A | 11/1991 | Dlugokecki |
| 5,145,329 A | 9/1992 | Zumbusch |
| 5,201,645 A | 4/1993 | Steele |

(Continued)

FOREIGN PATENT DOCUMENTS

JP 2013064356 A 4/2013

OTHER PUBLICATIONS

See Corresponding Search Report for PCT/US2020/027148.

*Primary Examiner* — Connor J Tremarche
(74) *Attorney, Agent, or Firm* — Davidson, Davidson & Kappel, LLC

(57) ABSTRACT

A pump includes a fluid inlet section, a fluid outlet section, a rotor axially between the fluid inlet section and the fluid outlet section, a center section radially inside of the rotor and a stator including electrical coils for generating electromagnetic flux for moving the rotor around the center section. The rotor and the center section define a fluid flow chamber radially therebetween. The rotor is rotatable about the center section by the electromagnetic flux generated by the electrical coils. An inlet control section is configured for regulating fluid flow from the fluid inlet section into the fluid flow chamber during rotation of the rotor inside of the stator about the center section. An outlet control section is configured for regulating fluid flow from the fluid flow chamber into the fluid outlet section during rotation of the rotor inside of the stator about the center section. The electrical coils are axially offset from the rotor.

20 Claims, 6 Drawing Sheets

(56) References Cited

U.S. PATENT DOCUMENTS

| | | |
|---|---|---|
| 5,205,721 A | 4/1993 | Issacson |
| 5,211,546 A | 5/1993 | Issacson |
| 5,476,374 A | 12/1995 | Langreck |
| 5,711,408 A | 1/1998 | Dick |
| 6,109,887 A | 8/2000 | Takura et al. |
| 7,641,457 B2 | 1/2010 | Asai |
| 8,038,423 B2 | 10/2011 | Nakayoshi |
| 8,376,720 B2 | 2/2013 | Rosalik, Jr. |
| 8,408,881 B2 | 4/2013 | Crotti |
| 8,905,735 B2 | 12/2014 | Holtzapple |
| 2001/0051098 A1 | 12/2001 | Kenney et al. |
| 2006/0051229 A1 | 3/2006 | Thoms |
| 2007/0231176 A1 | 10/2007 | Asai |
| 2007/0286752 A1 | 12/2007 | Hanke et al. |
| 2009/0175751 A1* | 7/2009 | Nakayoshi ............... F04C 2/102 |
| | | 418/171 |
| 2010/0008797 A1* | 1/2010 | Yukitake ................ F04C 14/28 |
| | | 417/310 |
| 2010/0047088 A1 | 2/2010 | Martin |
| 2011/0200477 A1 | 8/2011 | Chua |
| 2012/0034107 A1 | 2/2012 | Crotti |
| 2013/0071267 A1 | 3/2013 | Miyaki |
| 2014/0112813 A1 | 4/2014 | Gilbert |
| 2014/0119963 A1 | 5/2014 | Hadar et al. |
| 2014/0271282 A1 | 9/2014 | Francini |
| 2015/0152732 A1 | 6/2015 | Holtzapple |
| 2015/0288249 A1 | 10/2015 | Hemphill et al. |
| 2016/0025092 A1* | 1/2016 | Miyagawa .......... F04C 15/0034 |
| | | 417/410.4 |

* cited by examiner

INTEGRATED MOTOR AND PUMP INCLUDING AXIALLY PLACED COILS

The present disclosure relates generally to pumps and more specifically to pumps of automotive vehicle transmissions.

BACKGROUND

In an automatic transmission vehicle, electrically driven auxiliary pumps may be used. These pumps may be integrated into a transmission internally or externally depending on axial constraints and system requirements.

SUMMARY OF THE INVENTION

A pump is provided. The pump includes a fluid inlet section, a fluid outlet section, a rotor axially between the fluid inlet section and the fluid outlet section, a center section radially inside of the rotor and a stator including electrical coils for generating electromagnetic flux for moving the rotor around the center section. The rotor and the center section define a fluid flow chamber radially therebetween. The rotor is rotatable about the center section by the electromagnetic flux generated by the electrical coils. An inlet control section is configured for regulating fluid flow from the fluid inlet section into the fluid flow chamber during rotation of the rotor inside of the stator about the center section. An outlet control section is configured for regulating fluid flow from the fluid flow chamber into the fluid outlet section during rotation of the rotor inside of the stator about the center section. The electrical coils are axially offset from the rotor.

In embodiments of the pump, the stator may include a plurality of circumferentially spaced axially extending bars, each of the electrical coils being wrapped around one of the bars. The electromagnetic flux generated by each bar may follow a three-dimensional path. Each of the bars may include a respective portion aligned radially outside of the rotor. The pump may be configured such that the rotor contacts the respective portion of each of the bars during rotation due to the electromagnetic flux generated by the electrical coils urging the rotor toward the bars in sequence. The three-dimensional path involves the electromagnetic flux flowing axially along the respective bar, radially inward from the respective portion to the rotor and circumferentially along the rotor. The stator may include a base section mounted on the fluid inlet section or the fluid outlet section and the bars may protrude axially from the base section. The bars may extend axially past the inlet control section or the outlet control section. The rotor, the stator, the inlet control section and the outlet control section may be arranged and configured such that rotation of the rotor in the stator generates in the fluid flow chamber a suction portion and a pressure portion that rotate about a center axis of the center section as the rotor is rotated by the electromagnetic flux. The inlet control section may be configured such that fluid from the fluid inlet section is forced through the inlet control section to the suction portion as the suction portion rotates about the center axis. The outlet control section may be configured such that fluid from the fluid flow chamber is forced through the outlet control section from the pressure portion to the fluid outlet section as the pressure portion rotates about the center axis. The inlet control section and the outlet control section may be rotationally fixed so as not to rotate as the rotor rotates. The rotor and the stator may be arranged and configured such that the rotor moves eccentrically within the stator. The center section may be have a star shaped cross-section as viewed axially and the rotor may include an inner diameter surface that defines a borehole having a star shaped cross-section as viewed axially. The center section may include a plurality of circumferentially spaced radially outwardly extending protrusions protruding away from a center axis of the center section and an inner diameter surface of the rotor includes a plurality of circumferentially spaced radially outwardly extending grooves extending away from center axis. The center section may be rotationally fixed so as not to rotate as the rotor rotates.

An automotive vehicle transmission comprising the pump is also provided.

A method of constructing a pump is also provided. The method includes providing a rotor and a center section, the center section being radially inside of the rotor; providing a stator including electrical coils for generating electromagnetic flux for moving the rotor around the center section, the rotor and the center section defining a fluid flow chamber radially therebetween, the rotor being rotatable about the center section by the electromagnetic flux generated by the electrical coils; fixing an inlet control section with respect to the stator at a first axial side of the rotor and providing a fluid inlet section upstream of the inlet control section; and fixing an outlet control section with respect to the stator at a second axial side of the rotor and providing a fluid outlet section downstream of the outlet control section. The inlet control section is configured for regulating fluid flow from the fluid inlet section into the fluid flow chamber during rotation of the rotor by the electromagnetic flux. The outlet control section is configured for regulating fluid flow from the fluid flow chamber into the fluid outlet section during rotation of the rotor by the electromagnetic flux. The electrical coils are axially offset from the rotor.

In embodiments of the method, the stator may include a plurality of circumferentially spaced axially extending bars, each of the electrical coils being wrapped around one of the bars. The electromagnetic flux generated by each bar may follow a three-dimensional path. Each of the bars may include a respective portion aligned radially outside of the rotor. The pump may be constructed such that the rotor contacts the respective portion of each of the bars during rotation due to the electromagnetic flux generated by the electrical coils urging the rotor toward the bars in sequence.

BRIEF DESCRIPTION OF THE DRAWINGS

The present disclosure is described below by reference to the following drawings, in which.

DETAILED DESCRIPTION

The disclosure provides a space-saving electrically driven auxiliary pump. In one preferred embodiment, a stator of the pump has six poles, each wound with copper wire coils. The coils are energized in sequence to create a rotating force vector on rotor shaped as an outer gerotor. The rotor is forced to rotate around a center section shaped as an inner gerotor. As this eccentric rotation happens, various lobes between the rotor and the center section increase and decrease in volume, causing suction or pressure in the working fluid of the pump (for example, Automatic Transmission Fluid). The flow of fluid is controlled by a suction side (inlet) housing and a pressure side (outlet) housing. Each housing provides a main connection to either the sump or the main line of the hydraulic system being pressurized. In embodiments, the electrical coils are below the pump body, resulting in a longer, but skinnier, pump. This design also provides a magnetic flux path that is 3 dimensional. The flux, created by the electrical coils, proceeds axially up a stator bar, radially into the rotor of the pump, circumferentially around the rotor, radially out to the stator bar, axially down the adjacent stator bar, into the base of the stator, circumferentially across the base, and axially back up the stator bar.

Figure 1:
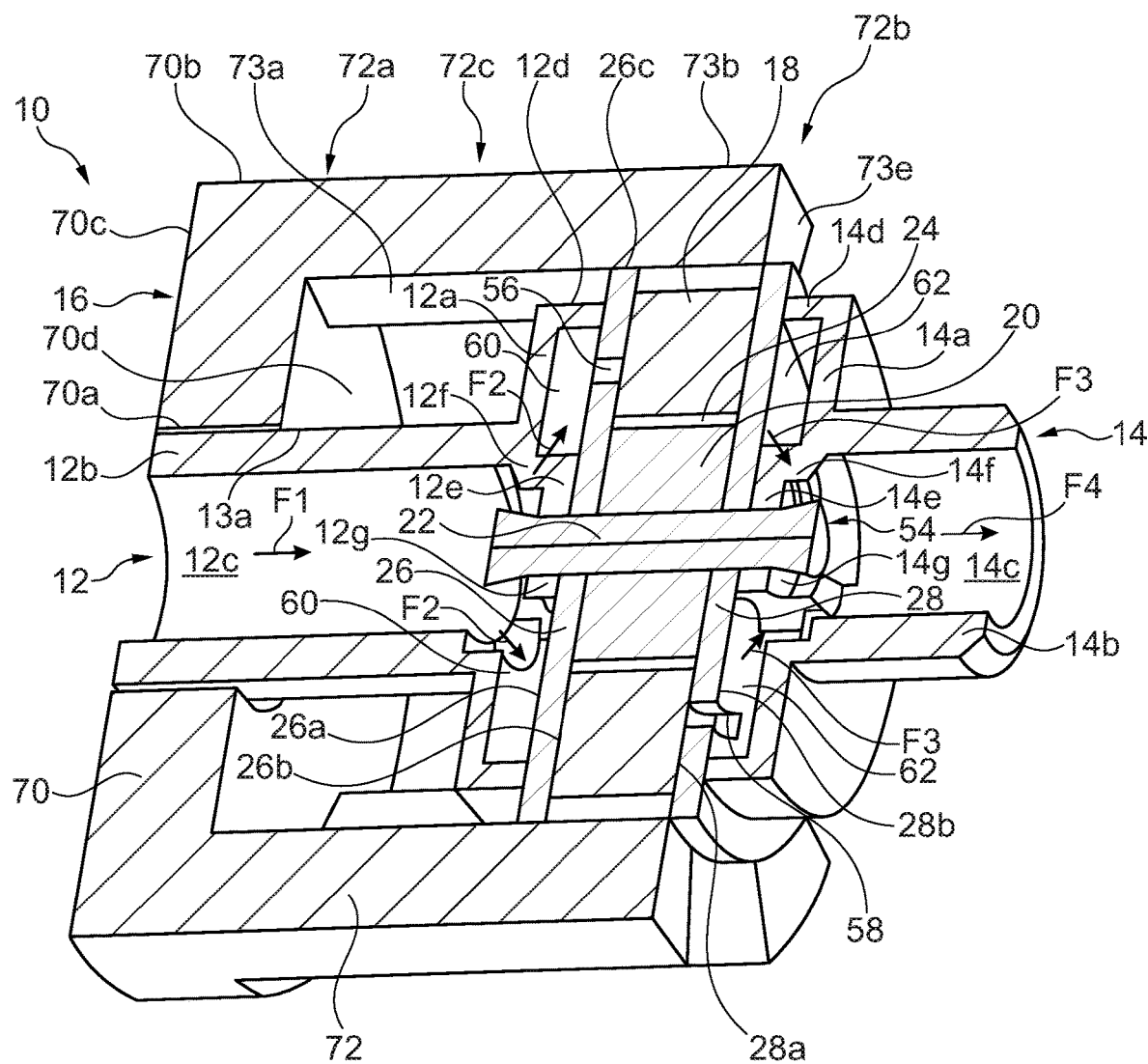
FIG. 1 schematically shows a radial perspective cross-sectional side view of a pump for an automotive vehicle transmission according to an embodiment of the present disclosure.
Figure 2:
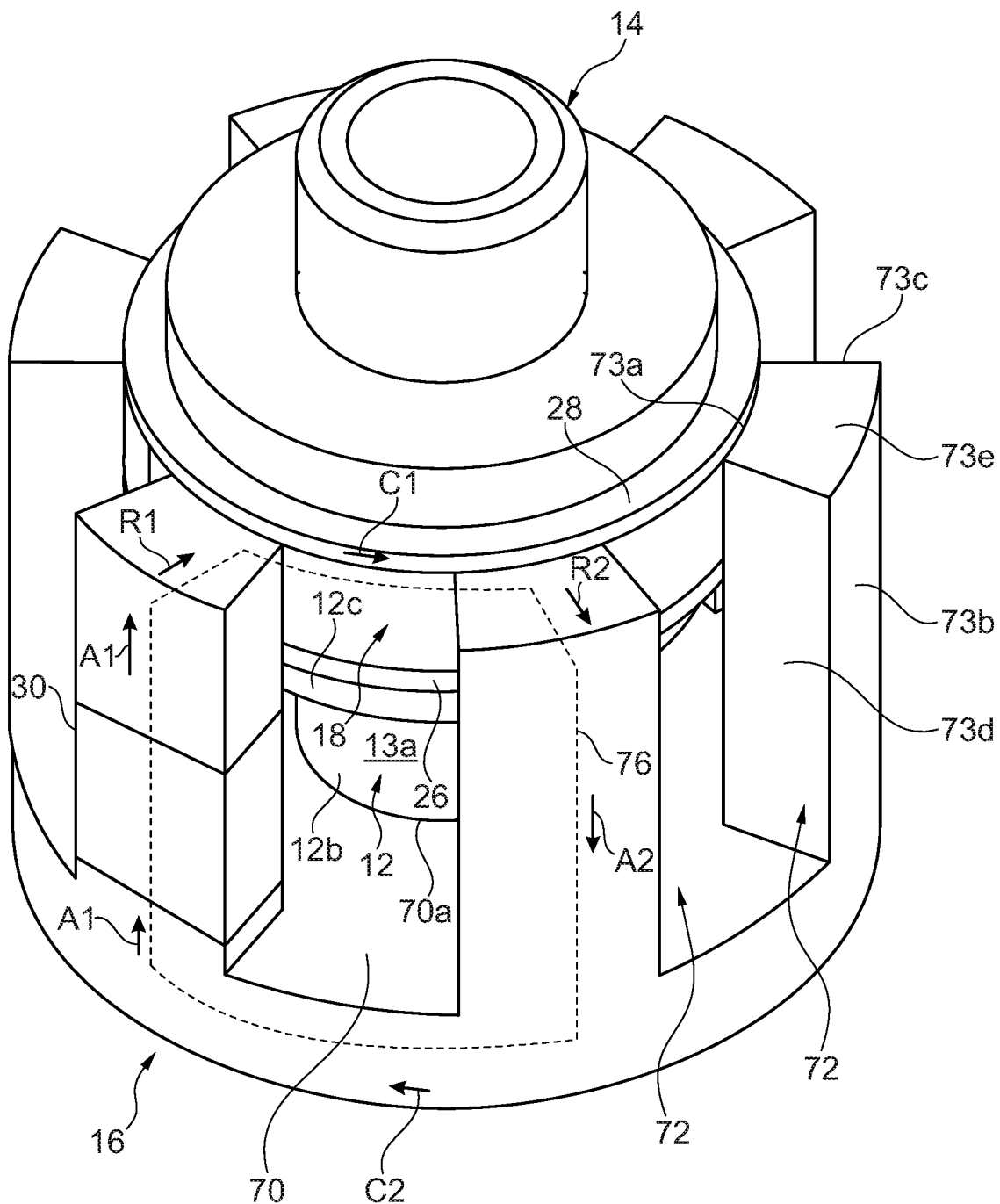
FIG. 2 schematically shows a perspective view of the pump shown in FIG. 1.
Figure 3:
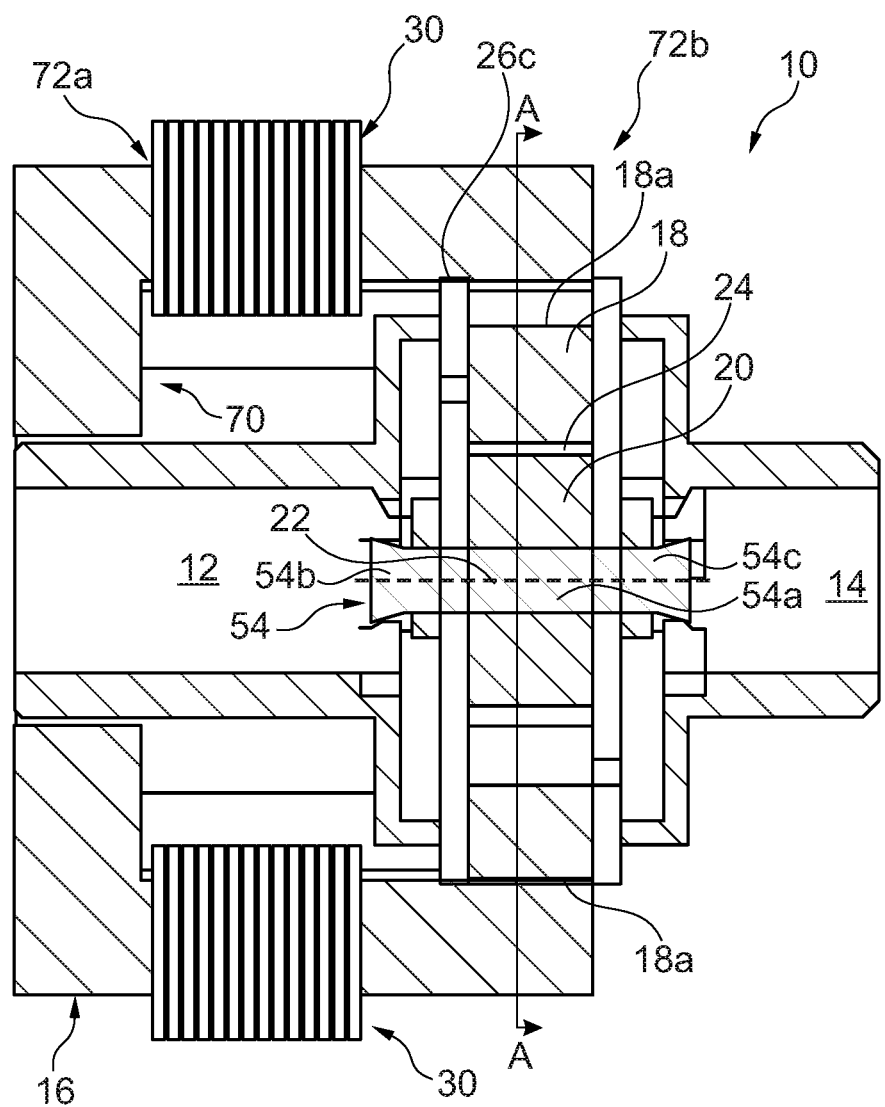
FIG. 3 schematically shows a radial cross-sectional side view of the pump shown in FIGS. 1 and 2.

FIG. 1 schematically shows a cross-sectional radial perspective view of a pump 10 for an automotive vehicle transmission according to an embodiment of the present disclosure; FIG. 2 schematically shows a perspective view of the pump 10 shown in FIG. 2; and FIG. 3 schematically shows a cross-sectional radial perspective view of pump 10. Pump 10 may be used in other contexts besides an automotive vehicle transmission. Pump 10 includes two housing sections—a first housing section 12 and a second housing section 14. Pump 10 further includes a stator 16 supported on first housing section 12 and a rotor 18 axially between first housing section 12 and second housing section 14. In the embodiment shown in FIGS. 1 to 3, first housing section 12 is a fluid inlet section and second housing section 14 is a fluid outlet section; however, in other embodiments stator 16 can be mounted on the fluid outlet section. Rotor 18 is shaped as an outer gerotor and configured to rotate eccentrically within stator 16 about a center section 20, which is shaped as an inner gerotor. Center section 20 forms a stator of the pump, stator 16 forms a stator of the electric motor and rotor 18 is rotor of both the pump and the electric motor. Center section 20 is nonrotably fixed with respect to inlet and outlet section 12, 14, meaning that center section 20 is rotationally fixed so as not to rotate as rotor 18 rotates. A center of center section 20 defines a center axis 22 of pump 10 about which rotor 18 is designed to rotate. The terms radially, circumferentially and radially as used herein are used with respect to center axis 22, unless otherwise specified.

Rotor 18 and center section 20 define a fluid flow chamber 24 radially therebetween. Pump 10 also includes an inlet control section 26 configured for regulating fluid flow from fluid inlet section 12 into fluid flow chamber 24 and an outlet control section 28 configured for regulating fluid flow from fluid flow chamber 24 into fluid outlet section 14. Inlet control section 26 and outlet control section 28 are non-rotatably fixed in place with respect to center axis 22 and thus are rotationally fixed so as not to rotate as rotor 18 rotates. Inlet control section 26 and outlet control section 28 are made of materials that are not magnetically conductive and withstand the sliding along the surfaces thereof of the rotor 18. In one preferred embodiment, sections 26, 28 can be made of aluminum. In other embodiments, section 26, 28 can be made of plastic or stainless steel.

Each of inlet section 12 and outlet section 14 has a stepped shape. Inlet section 12 includes a radially smaller section 12b that defines an upstream chamber 12c for axial fluid flow F1 and a radially larger section 12d downstream of section 12b that is radially outside of and circumferentially surrounds inlet control section 26. In the embodiment shown in FIGS. 1 to 3, sections 12b, 12d are cylindrically shaped. Radially smaller and larger sections 12b, 12d are joined by a flange section 12a, which is disc-shaped. Inlet control section 26 is formed as a circular plate having a hole in the center thereof for receiving fastener 54. Inlet control section 26 is fixed in place against larger section 12d.

Outlet section 14 includes a radially smaller section 14b, which in the embodiment shown in FIGS. 1 to 3 is cylindrically shaped, that defines a downstream chamber 14c for axial fluid flow F4 and a radially larger section 14d upstream of section 14b that is radially outside of and circumferentially surrounds outlet control section 28. In the embodiment shown in FIGS. 1 to 3, sections 14b, 14d are cylindrically shaped. Radially smaller and larger sections 14b, 14d are joined by a flange section 14a, which is disc-shaped. Outlet control section 28 is formed as a circular plate having a hole in the center thereof for receiving fastener 54. Outlet control section 28 is fixed in place against larger section 14d.

As shown most clearly in FIG. 2, stator 16 includes a base section 70 having a disc shape and a plurality of axially extending bars 72, which are circumferentially spaced apart from each other, protruding axially from base section 70. Base section 70 is nonrotatably fixed on radially smaller section 12b. More specifically, base section 70 includes an inner circumferential surface 70a non-rotatably mounted on an outer circumferential surface 13a of section 12b. Base section 70 extends radially outward from inner circumferential surface 70a to an outer circumferential surface 70b thereof. Base section 70 also includes two radially extending surfaces 70c, 70d extending radially from inner circumferential surface 70a to outer circumferential surface 70b. First radially extending surface 70c faces axially away from rotor 18 and a second radially extending surface 70d faces axially toward rotor 18.

Bars 72 each include a proximal or base end 72a fixed to base section 70 at surface 70d and a distal or free end 72b spaced axially from base section 70, with an intermediate section 72c between free end 72b and base end 72a. As denoted in FIG. 2, each bar 72 includes an inner circumferential surface 73a, an outer circumferential surface 73b, and two radially extending circumferentially facing surfaces 73c, 73d extending radially from inner circumferential surface 73a to outer circumferential surface 73b. In the embodiment shown in FIGS. 1 to 3, bars 72 have a tapered shaped when viewed axially, with outer circumferential surface 73b being circumferentially wider than inner circumferential surface 73a, and surfaces 73c, 73d extending circumferentially away from each other and inner circumferential surface 73a as surfaces 73c, 73d extend radially outward. At free end 72b, each bar 72 includes an axially facing radially extending surface 73e, which is delimited by surfaces 73a to 73d, defining an axial edge of the respective bar 72.

Bars 72 each extend axially past radially larger section 12d of inlet section 12, inlet control section 26 and along an outer circumferential surface 18a of rotor 18. An outer circumferential surface 26c of inlet control section 26 contacts inner circumferential surface 73a of each bar 72. A portion of inner circumferential surface 73a of each bar 72 that is axially between control sections 26, 28 is contacted by outer circumferential surface 18a of rotor 18 in sequence due to the energizing of electrical coils 30, as described below. Axially facing radially extending surface 73e may be radially aligned with chamber side radially extending surface 28a of outlet control section 28.

Stator 16 is provided with a plurality of electrical coils 30 (FIGS. 2 and 3) for generating electromagnetic forces in stator 16 to urge rotor 18 toward stator 16 such that rotor 18 rotates, i.e., wobbles, inside of stator 16 about axis 22. A coil 30 is wrapped around each of bars 72. More specifically, each coil 30 is wrapped multiple times around each of surfaces 73a, 73b, 73c, 73d at intermediate section 72c of the respective bar 72. In this embodiment, stator 16 is provided with six bars 72 and six electrical coils 30, but in other embodiments, stator 16 may be provided with any other amounts of bars 72 and coils 30 greater than three. In one preferred embodiment, coils 30 are formed by copper wires.

Figure 4:
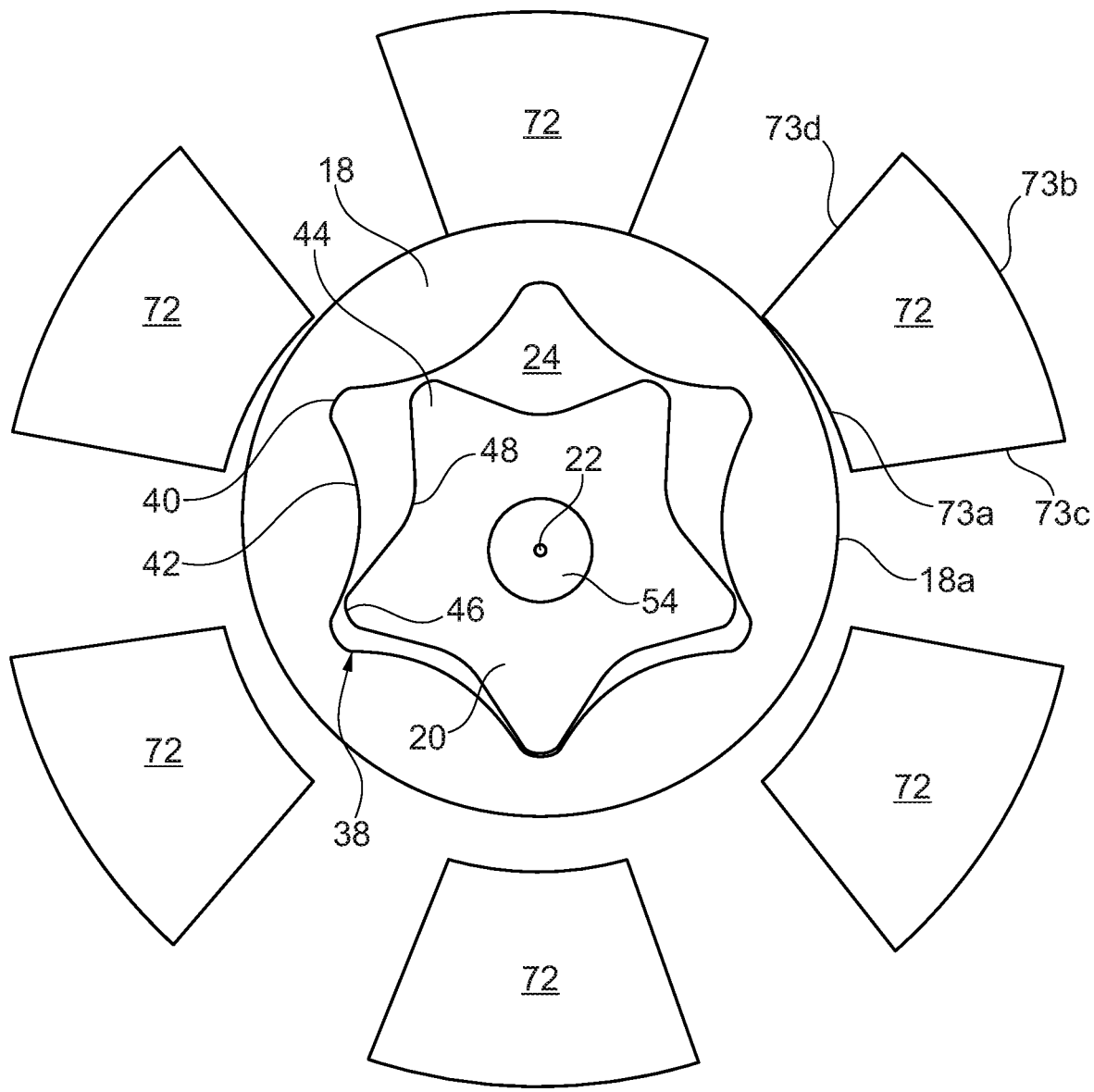
FIG. 4 shows an axial cross-sectional view of the pump along A-A in FIG. 3.
Figure 5:
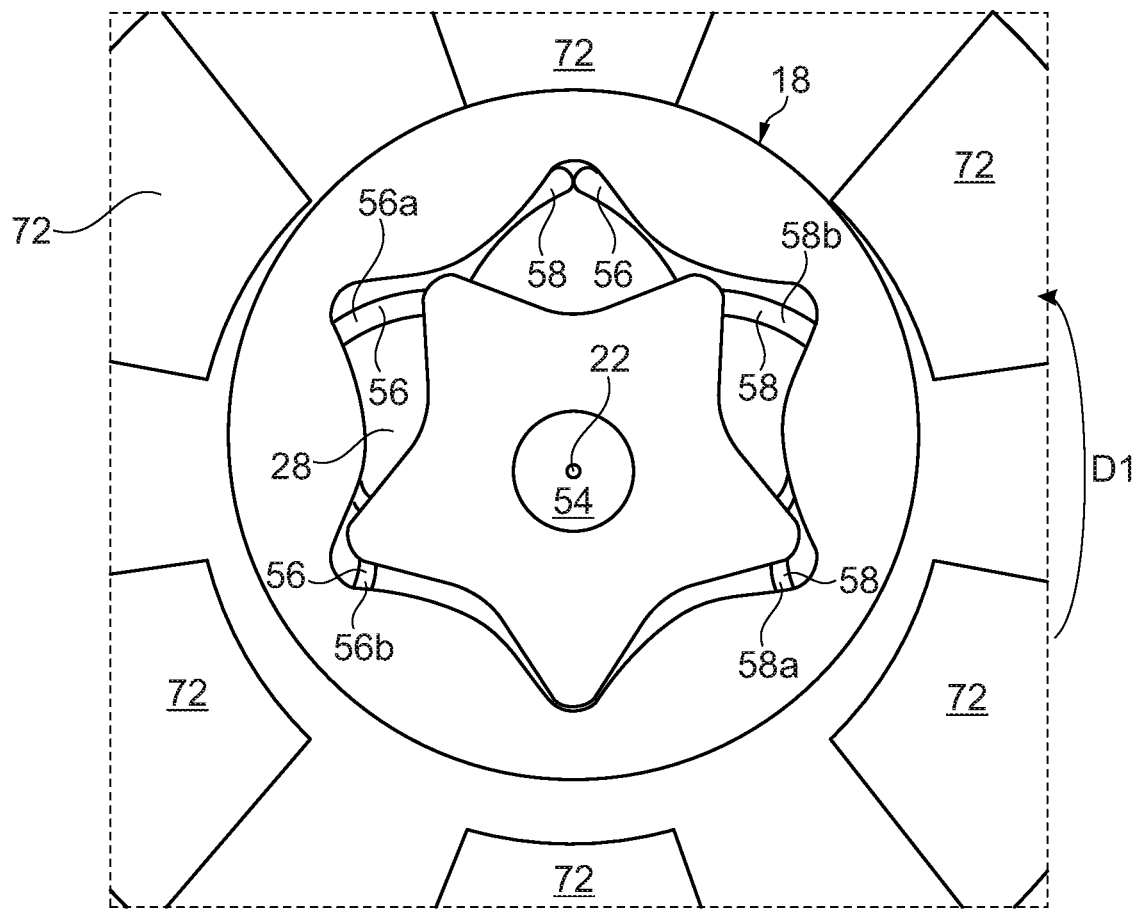
FIG. 5 shows an axial cross-sectional view of the pump to schematically illustrate suction or inlet ports formed in an inlet control section and pressure or outlet ports formed in an outlet control section.

FIGS. 4 and 5 schematically show an axial cross-sectional view of pump 10 along A-A in FIG. 1a. FIG. 4 illustrates only bars 72, rotor 18, center section 20 and fastener 54, while FIG. 5 additionally illustrates outlet control section 28 and ports 56 of inlet control section 26.

As shown in FIGS. 4 and 5, rotor 18 in this embodiment has a cylindrical shape with a cylindrical outer diameter surface and an inner diameter surface that defines a borehole having a star shaped cross-section when view axially. As denoted in FIG. 4, the inner diameter surface of rotor 18 includes a plurality of circumferentially spaced radially outwardly extending grooves 38 extending away from center axis 22. Grooves 38 each have a concave shape and include a radially outermost nadir 40. Adjacent grooves 38 are spaced apart from each other by convex surfaces 42, which define portions of rotor 18 that are radially thicker than portions of rotor 18 at grooves 38.

Center section 20 in this embodiment has a star shaped cross-section when viewed axially and includes a plurality of circumferentially spaced radially outwardly extending protrusions 44 protruding away from center axis 22. Protrusions 44 each include a radially outermost rounded tip 46. Adjacent protrusions 44 are spaced apart from each other by concave surfaces 48, which define portions of center section 20 that are radially thinner than portions of center section 20 at protrusions 44.

In this embodiment, rotor 18 includes six grooves 38 and center section 20 includes five protrusions 44, but in other embodiments rotor 18 may include other amounts of grooves 38 and center section 20 may include other amounts of protrusions 44, with the amount of protrusions 44 being one less than the number of grooves 38.

As shown in FIGS. 1 and 3, fluid inlet section 12, inlet control section 26, fluid outlet section 14 and outlet control section 28 are fixed axially together by fastener 54 passing axially through a center of center section 22, a center of inlet control section 26, a center of outlet control section 28 and respective connecting sections 12e, 14e of inlet section 12 and outlet section 14. Connecting sections 12e, 14e each include a plurality of circumferentially spaced legs 12f, 14f that extend radially from a center portion 12g, 14g, which that receives fastener 54 and contacts the respective section 26, 28, to join the respective section 12b, 14b. Center section 20 is axially between inlet control section 26 and outlet control section 28. Fastener 54 is centered on center axis 22 and includes a shaft 54a passing through sections 12e, 14e, 20, 26, 28 and two heads 54b, 54c contacting sections 12e, 14e, respectively. Fluid flow chamber 24 is delimited axially between control sections 26, 28 and radially between the inner diameter surface of rotor 18 and the outer diameter surface of center section 20.

Coils 30 are energized in sequence to create a rotating force vector on rotor 18 so that rotor 18 rotates on center section 20. Rotor 18 is configured such that during rotation thereof, grooves 38 sequentially are forced onto protrusions 44 to continuously vary the configuration of fluid flow chamber 24. As rotor 18 eccentrically rotates about center section 20, the various lobes formed between rotor 18 and center section 20 increase and decrease in volume. More specifically, when an electric current is sent through any one of coils 30 a magnetic field is created which pulls rotor 18 toward the bar 72 around which the energized coil 30 is wrapped in order to complete a magnetic circuit formed by bars 72 of stator 16. As rotor 18 moves toward the bar 72 whose coil 30 is energized, rotor 18 displaces fluid, with which fluid flow chamber 24 between the rotor and stator is filled, creating pressure. The movement of rotor 18 within stator 16 about center section 20 separates fluid flow chamber 24 into a first portion, i.e., a pressure portion, that is pressurized to force fluid out of outlet section 14 and a second portion, i.e., a suction portion, that forms a vacuum to draw fluid into fluid flow chamber 24 from inlet section 12. The first portion of fluid flow chamber 24 accordingly has a lower pressure than the second portion of fluid flow chamber 24. As rotor 18 rotates within stator 16 about center section 20, the locations of the pressure portion and the suction portion of fluid flow chamber 24 rotate about center axis 2, with the pressure portion of fluid flow chamber 24 being oriented on the opposite radial side of center section 20 as the suction portion of fluid flow chamber 24 during the rotation.

As shown in FIG. 3, electrical coils 30 are axially offset from rotor 18, resulting in a longer, but skinnier, pump. As shown in FIG. 2, where a coil 30 on one bar 72 is shown schematically, the placement of coils 30 axially offset from rotor 18 provides a magnetic flux path 76 is 3-dimensional. The flux, created by the electrical coil 30, proceeds axially along a first bar 72 in a first axial direction A1, radially into rotor 18 in a first radial direction R1, circumferentially around rotor 18 in a first circumferential direction C1, radially out of rotor 18 to a circumferentially adjacent second bar 72 in a second radial direction R2, axially along the stator bar 72 in a second axial direction A2, into base section 70 of stator 16, and circumferentially across the base section 70, and axially along the stator bar 72 in the first axial direction A1 to the coil 30.

Inlet control section 26 is configured such that fluid from fluid inlet section 12 is forced through inlet control section 26 to fluid flow chamber 24 by the movement of rotor 18 as the suction portion rotates about the center axis 22. Outlet control section 28 is configured such that fluid from fluid flow chamber 24 is forced through outlet control section 28 from the pressure portion to fluid outlet section 14 as the pressure portion rotates about center axis 22.

Figure 6:
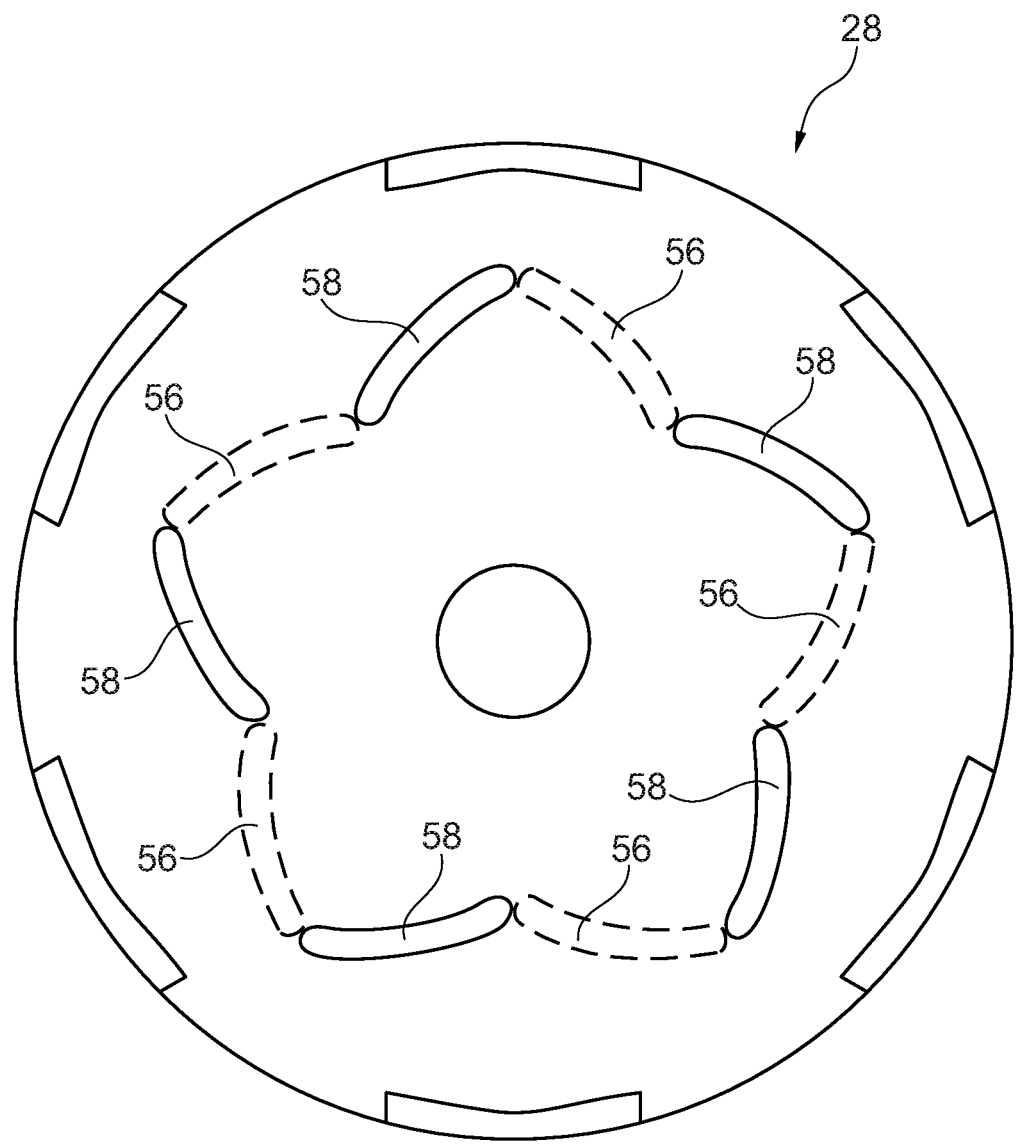
FIG. 6 shows an unobstructed view of an outlet control section showing outlet ports, and also showing where inlet ports are positioned with respect to outlet ports.

FIG. 5 schematically illustrates suction or inlet ports 56 formed in inlet control section 26 and pressure or outlet ports 58 formed in outlet control section 28. It should be understood that a cross-sectional axial view of pump 10 would not show both sets of ports 56, 58, and they are merely shown in FIG. 5 for illustrative purposes. FIG. 6 shows an unobstructed view of outlet control section 28 showing outlet ports 58, and also showing where inlet ports 56 are positioned with respect to outlet ports 58. In order to regulate the flow of fluid from inlet section 12 into fluid flow chamber 24, inlet control section 26 includes a plurality of inlet ports 56 formed therein passing from an inlet side radially extending surface 26a to a chamber side radially extending surface 26b of inlet control section 26. In order to regulate the flow of fluid from fluid flow chamber 24 to outlet section 14, outlet control section 28 includes a plurality of outlet ports 58 formed therein passing from a chamber side radially extending surface 28a to an outlet side radially extending surface 28b of inlet control section 28. Ports 56, 58 are passive ports which follow the motion of rotor 18 and provide an inlet and outlet for each lobe of chamber 24 as the rotor 18 spins. Ports 56, 58 have a geometry configured with respect to a geometry of rotor 18 and center section 20 that causes rotor 18 to constantly vary in axial alignment and coverage of ports 56, 58 during rotation of the rotor 18 inside of stator 16 about the center section 20 to regulate a flow fluid entering into and out of fluid flow chamber 24 during rotation of the rotor 18 inside of stator 16 about the center section 20.

Inlet ports 56 extend both radially and circumferentially and are arc shaped and circumferentially spaced from each other, with one inlet port 56 being provided for each protrusion 44. Inlet ports 56 are arranged such that during the rotation of rotor 18 within stator 16 about center section 20, an amount of each port 56 covered by rotor 18 constantly changes. As the amount of a port 56 exposed to chamber 24 increases, fluid from inlet section 12 is sucked into fluid flow chamber 24. Accordingly, in FIG. 5, with rotor 18 rotating counter-clockwise in circumferential direction D1, fluid is flowing through a port 56a into fluid flow chamber 24. As shown in FIG. 1, an axial fluid flow F1 flows into inlet section 12 and is forced radially outward at inlet side radially extending surface 26a of inlet control section 26 to provide a radial fluid flow F2 to a channel 60 formed between flanged section 12a of inlet section 12 and surface 26a. The radial fluid flow F2 then is sucked into chamber 24 through ports 56 at varying times in response to the motion of rotor 18 about center section 20.

As the suction portion is continuously rotating around axis 22, fluid flows through inlet ports 56 in succession when each inlet port 56 is aligned with the suction portion of chamber 24—i.e., as the amount of a port 56 covered by rotor 18 decreases. Referring to FIG. 5 and assuming that rotor 18 is rotating counter clockwise, the suction portion of chamber 24 is aligned with port 56a and fluid is being sucked into chamber 24 via port 56a. Next, based on the continued rotation of rotor 18, the suction portion of chamber 24 will be aligned with a port 56b and fluid will being sucked into chamber 24 via port 56b.

Outlet ports 58 also extend both radially and circumferentially and are arc shaped and circumferentially spaced from each other, with one outlet port 58 being provided for each protrusion 44. In the embodiment shown in FIGS. 5 and 6, outlet ports 58 are circumferentially offset from each other, such that when viewed axially, each outlet port 58 is circumferentially between two inlet ports 56. Outlet ports 58 are arranged such that during the rotation of rotor 18 within stator 16 about center section 20, an amount of each port 58 covered by rotor 18 constantly changes. As the amount of a port 58 exposed to chamber 24 decreases, fluid in chamber 24 is forced through the port 58 into outlet section 14. Accordingly, in FIG. 5, with rotor 18 rotating counter-clockwise in circumferential direction D1, fluid is flowing through a port 58a into outlet section 14. The fluid flowing through the outlet ports 58 then flows radially inward to generate a radial fluid flow F3 through a channel 62 formed between flanged section 14a of outlet section 14 and surface 28b of outlet control section 28. Radial fluid flow F3 then merges into an axial fluid flow F4 flowing out of outlet section 14.

As the pressure portion is continuously rotating around axis 22, fluid flows through outlet ports 58 in succession when each inlet port 58 is aligned with the pressure portion of chamber 24—i.e., as the amount of a port 58 covered by rotor 18 increases. Referring to FIG. 3 and assuming that rotor 18 is rotating counter clockwise, the pressure portion of chamber 24 is aligned with port 58a and fluid is being forced out of chamber 24 into via port 58a. Next, based on the continued rotation of rotor 18, the suction portion of chamber 24 will be aligned with a port 58b and fluid will being forced out of chamber 24 via port 58b.

Accordingly, rotor 18 and stator 16 are configured such that each of the pressure portion and the suction portion passes by each of inlet ports 56 and each of outlet ports 58 multiple times during a single rotation of rotor 18 about center axis 22. More specifically, in the embodiment shown in FIGS. 1 to 6, fluid flows through each of inlet ports 56 and each of outlet ports 58 during each ⅕ rotation of rotor 18 about axis 22, such that fluid flows through each of ports 56, 58 an amount of time equal to the number of protrusions 44 during each rotation of rotor 18 about axis 22.

Pump 10 also includes a controller configured to control the flow of the current through electrical coils 30 to rotate the rotor 18. In this embodiment, controller is in the form of transistors on control board for electrically commutating and controlling pump 10. Alternately, the controller can be remote and connected to coils 30 by wires.

In the embodiment shown in the figures, pump 10 is a gerotor pump; however, in other embodiments, a similar construction may be made with other pump types, including an internal gear pump or a vane pump.

In the preceding specification, the disclosure has been described with reference to specific exemplary embodiments and examples thereof. It will, however, be evident that various modifications and changes may be made thereto without departing from the broader spirit and scope of disclosure as set forth in the claims that follow. The specification and drawings are accordingly to be regarded in an illustrative manner rather than a restrictive sense.

LIST OF REFERENCE NUMERALS 10 pump
12 fluid inlet section
12a flanged section
12b radially smaller section
12c upstream chamber
12d radially larger section
12e connecting section
12f circumferentially spaced legs
12g center portion
fluid outlet section
14a flanged section
14b radially smaller section
14c downstream chamber
14d radially larger section
14e connecting section
14f circumferentially spaced legs
14g center portion
16 stator
18 rotor
20 center section 22 center axis
24 fluid flow chamber
26 inlet control section
26a inlet side radially extending surface
26b chamber side radially extending surface
28 outlet control section
28a chamber side radially extending surface
28b outlet side radially extending surface
30 electrical coils
38 grooves
40 radially outermost nadir
42 convex surface
44 radially outwardly extending protrusions
46 radially outermost rounded tip
48 concave surfaces
54 fastener
54a fastener shaft
54b, 54c fastener heads
56, 56a, 56b inlet ports
58, 58a, 58b outlet ports
60 channel
62 channel
70 stator base section
70a inner circumferential surface
70b outer circumferential surface
70c, 70d radially extending surfaces
72 stator bars
72a base end
72b free end
72c intermediate section
73a inner circumferential surface
73b outer circumferential surface
73c, 73d radially extending circumferentially facing surfaces
76 flux path
F1 inlet axial fluid flow
F2 inlet radial fluid flow
F3 outlet radial fluid flow
F4 outlet axial fluid flow

What is claimed is:

1. A pump comprising:
a fluid inlet section;
a fluid outlet section;
a rotor axially between the fluid inlet section and the fluid outlet section;
a center section radially inside of the rotor;
a stator including electrical coils for generating electromagnetic flux for moving the rotor around the center section, the rotor and the center section defining a fluid flow chamber radially therebetween, the rotor being rotatable about the center section by the electromagnetic flux generated by the electrical coils;
an inlet control section configured for regulating fluid flow from the fluid inlet section into the fluid flow chamber during rotation of the rotor inside of the stator about the center section; and
an outlet control section configured for regulating fluid flow from the fluid flow chamber into the fluid outlet section during rotation of the rotor inside of the stator about the center section,
the electrical coils being axially spaced apart from the rotor such that a distance is formed between an end of the electric coils facings the rotor and an end of the rotor facing the electric coils,
wherein the stator includes a base section and a plurality of circumferentially spaced axially extending bars extending axially from the base section, each of the bars including a proximal end fixed to the base section, a distal end spaced axially from base section and an intermediate section axially between the distal end and the proximal end, each of the electrical coils being wrapped around one of the bars at the intermediate section,
wherein the bars extend axially past the inlet control section or the outlet control section.

2. The pump as recited in claim 1 wherein the electromagnetic flux generated by each bar follows a three-dimensional path.

3. The pump as recited in claim 2 wherein the distal end of each of the bars is aligned radially outside of the rotor.

4. The pump as recited in claim 3 wherein the pump is configured such that the rotor contacts the distal end of each of the bars during rotation due to the electromagnetic flux generated by the electrical coils urging the rotor toward the bars in sequence.

5. The pump as recited in claim 4 wherein the three-dimensional path involves the electromagnetic flux flowing axially along the respective bar, radially inward from the distal end to the rotor and circumferentially along the rotor.

6. The pump as recited in claim 1 wherein the base section is mounted on the fluid inlet section or the fluid outlet section.

7. The pump as recited in claim 1 wherein the rotor, the stator, the inlet control section and the outlet control section are arranged and configured such that rotation of the rotor in the stator generates in the fluid flow chamber a suction portion and a pressure portion that rotate about a center axis of the center section as the rotor is rotated by the electromagnetic flux, the inlet control section being configured such that fluid from the fluid inlet section is forced through the inlet control section to the suction portion as the suction portion rotates about the center axis, the outlet control section being configured such that fluid from the fluid flow chamber is forced through the outlet control section from the pressure portion to the fluid outlet section as the pressure portion rotates about the center axis.

8. The pump as recited in claim 1 wherein the inlet control section and the outlet control section are rotationally fixed so as not to rotate as the rotor rotates.

9. The pump as recited in claim 1 wherein the rotor and the stator are arranged and configured such that the rotor moves eccentrically within the stator.

10. The pump as recited in claim 1 wherein the center section has a star shaped cross-section as viewed axially and the rotor includes an inner diameter surface that defines a borehole having a star shaped cross-section as viewed axially.

11. The pump as recited in claim 10 wherein the center section includes plurality of circumferentially spaced radially outwardly extending protrusions protruding away from a center axis of the center section and an inner diameter surface of the rotor includes a plurality of circumferentially spaced radially outwardly extending grooves extending away from center axis.

12. The pump as recited in claim 10 wherein the center section is rotationally fixed so as not to rotate as the rotor rotates.

13. An automotive vehicle transmission comprising the pump recited in claim 1.

14. A pump comprising:
a fluid inlet section;
a fluid outlet section;
a rotor axially between the fluid inlet section and the fluid outlet section;

a center section radially inside of the rotor;

a stator including electrical coils for generating electromagnetic flux for moving the rotor around the center section, the rotor and the center section defining a fluid flow chamber radially therebetween, the rotor being rotatable about the center section by the electromagnetic flux generated by the electrical coils;

an inlet control section configured for regulating fluid flow from the fluid inlet section into the fluid flow chamber during rotation of the rotor inside of the stator about the center section; and an outlet control section configured for regulating fluid flow from the fluid flow chamber into the fluid outlet section during rotation of the rotor inside of the stator about the center section, the electrical coils being axially spaced apart from the rotor, wherein the stator includes a base section and a plurality of circumferentially spaced axially extending bars extending axially from the base section, each of the bars including a proximal end fixed to the base section, a distal end spaced axially from base section and an intermediate section axially between the distal end and the proximal end, each of the electrical coils being wrapped around one of the bars at the intermediate section, wherein the pump is configured such that electromagnetic flux generated by a first coil of the coils wrapped around a first bar of the bars flows from the first coil axially away from the base section through the distal end of the first bar, then radially inward from the distal end of the first bar into the rotor, then circumferentially along the rotor to the distal end of a second bar of the bars, then radially from the rotor into the distal end of the second bar, then axially away from the distal end of the second bar and axially through the second bar to the base section, and then circumferentially along the base section to the proximal end of the first bar.

15. The pump as recited in claim 14 wherein the rotor and the stator are arranged and configured such that the rotor moves eccentrically within the stator.

16. The pump as recited in claim 14 wherein the center section has a star shaped cross-section as viewed axially and the rotor includes an inner diameter surface that defines a borehole having a star shaped cross-section as viewed axially.

17. The pump as recited in claim 14 wherein the center section includes plurality of circumferentially spaced radially outwardly extending protrusions protruding away from a center axis of the center section and an inner diameter surface of the rotor includes a plurality of circumferentially spaced radially outwardly extending grooves extending away from center axis.

18. A pump comprising:

a fluid inlet section;

a fluid outlet section;

a rotor axially between the fluid inlet section and the fluid outlet section;

a center section radially inside of the rotor;

a stator including electrical coils for generating electromagnetic flux for moving the rotor around the center section, the rotor and the center section defining a fluid flow chamber radially therebetween, the rotor being rotatable about the center section by the electromagnetic flux generated by the electrical coils;

an inlet control section configured for regulating fluid flow from the fluid inlet section into the fluid flow chamber during rotation of the rotor inside of the stator about the center section; and an outlet control section configured for regulating fluid flow from the fluid flow chamber into the fluid outlet section during rotation of the rotor inside of the stator about the center section, the electrical coils being axially spaced apart from the rotor such that a distance is formed between an end of the electric coils facings the rotor and an end of the rotor facing the electric coils, wherein the stator includes a base section and a plurality of circumferentially spaced axially extending bars extending axially from the base section, each of the bars including a proximal end fixed to the base section, a distal end spaced axially from base section and an intermediate section axially between the distal end and the proximal end, each of the electrical coils being wrapped around one of the bars at the intermediate section, wherein the electromagnetic flux generated by each bar follows a three-dimensional path, wherein the distal end of each of the bars is aligned radially outside of the rotor.

19. The pump as recited in claim 18 wherein the rotor and the stator are arranged and configured such that the rotor moves eccentrically within the stator.

20. The pump as recited in claim 18 wherein the center section has a star shaped cross-section as viewed axially and the rotor includes an inner diameter surface that defines a borehole having a star shaped cross-section as viewed axially.

* * * * *